United States Patent [19]
Dietzel

[11] Patent Number: 5,839,530
[45] Date of Patent: Nov. 24, 1998

[54] PROCESS FOR OPERATING A DRIVE UNIT FOR VEHICLES OR DRIVE UNIT

[75] Inventor: Bernd Dietzel, Syrgenstein, Germany

[73] Assignee: Voith Turbo GmbH & Co. KG, Heidenhein, Germany

[21] Appl. No.: 824,994

[22] Filed: Mar. 27, 1997

[30] Foreign Application Priority Data

Mar. 27, 1996 [DE] Germany ................ 196 12 034.9

[51] Int. Cl.⁶ ................................................ B60K 1/00
[52] U.S. Cl. ................................. 180/65.4; 290/40 R
[58] Field of Search ............................... 180/165, 65.1, 180/65.2, 65.3, 65.4, 65.5; 290/40 R, 40 A, 40 C

[56] References Cited

U.S. PATENT DOCUMENTS 547,363  10/1895  Kinya et al. .

FOREIGN PATENT DOCUMENTS

| | | |
|---|---|---|
| 0543390A | 5/1993 | European Pat. Off. . |
| 2057383A | 5/1971 | France . |
| 53-133814A | 11/1978 | Japan . |
| 60216703A | 3/1986 | Japan . |
| 63-007110A | 6/1988 | Japan . |

*Primary Examiner*—Richard M. Camby
*Attorney, Agent, or Firm*—Dvorak & Orum

[57] ABSTRACT

An apparatus and method for operating a drive installation unit for a vehicle which reduces environmentally harmful gases while improving drive acceleration and deceleration performance by integrating an electric motor and power converter with an internal combustion engine.

20 Claims, 1 Drawing Sheet

PROCESS FOR OPERATING A DRIVE UNIT FOR VEHICLES OR DRIVE UNIT

BACKGROUND OF THE INVENTION

1. Field of the Invention

The invention deals with a process for operating a drive unit for vehicles, especially commercial motor vehicles, further, a device, especially a drive installation for carrying out the process,

2. Description of The Prior Art

The starting point of the invention is a diesel-electric drive system as described, for example, in the documents

1. DE 42 05 770 C2
2. DE 41 33 059 A1

This kind of drive system or drive unit for vehicles, especially commercial motor vehicles, respectively, comprises at least one electric motor, connected with a drive wheel, which is preferably designed as a transverse flux motor and which is supplied with electric power by a current inverter. Furthermore, a generator is provided which is also preferably designed as a transverse flux motor and which can be coupled mechanically with an internal combustion engine, especially a diesel engine. For the purpose of generating electric power, the generator is controlled, for example, by a four-quadrant inverter. An overriding drive control unit is provided for setting the torque values at the wheel motors and controlling the rotational speed of the diesel engine.

In this type of diesel-electric design, power is supplied to the electric motors connected with the drive wheels, for example, by a diesel-engine/generator power pack. Further, the system can be expanded for hybrid drive systems by adding, for example, a battery.

The control of conveyed power or torque, exerted on the drive wheels, respectively, and the control of the diesel engine can be accomplished in various ways.

In the case of vehicles with conventional drive train, comprising an internal combustion engine and a multi-stage mechanical transmission, connected at least indirectly with the drive axle or drive wheels, respectively, the driver's request for higher speed or acceleration is normally realized by means of an accelerator or any other actuating device, which acts directly on a setting unit on the internal combustion engine, whereby the setting unit is a power setting device which, depending on engine type, can be designed as a throttle or as an injection unit. A setting change at the setting unit, requested by the driver, results in a corresponding change of torque at the internal combustion engine. The new torque is transmitted to the drive axle or drive wheels, respectively, by way of the mult-stage transmission with a particular transmission ratio selected. Depending on the available transmission ratios, the torque setting range stretches or shifts with regard to the torque exerted on the drive wheels. For a fixed accelerator setting, the torque set at the internal combustion engine by the accelerator remains approximately constant, that is, between approximately zero and the maximum torque that the internal combustion engine can convey at the given rotational speed. When starting, normally with the transmission set at the smallest available transmission ratio and, if necessary, aided by a friction clutch or suitable converter, the driver of such a vehicle should be able to adjust the torque to be exerted on the drive wheels in such a manner that the vehicle, when on an incline, can start to move without jerks or can even be maintained at standstill by prescribing the corresponding torque. Now, analogous to the conventional drive system, if in a diesel-electric drive system the setting range of the driver's request sensor is mapped onto the maximum torque to be exerted on the drive wheels, then a significantly poorer resolution is obtained than before, since the torque setting range is not spread out for lack of the transmission ratios.

In the case of the embodiments described in documents 1 and 2, the driver requests drive power or electric power to be drawn by the generator by means of the accelerator. The essential disadvantage of these approaches is the fact that the actual electric power output is nil when the vehicle at stillstand, and that setting power, no matter how small, immediately causes maximum torque at the drive motor and therefore at the drive wheels. Therefore, it is not possible to start moving without jerks or to maintain stillstand on an incline, unless an additional start controller is deployed.

The object of the invention is, therefore, to further develop a process for operating a drive unit, comprising an internal combustion engine, a generator and at least one electric motor for driving at least indirectly a wheel, and furthermore, a drive unit, in such a manner that above described disadvantages for diesel-electric drive trains can be avoided.

This object is solved by the characteristics of claims 1 and 6. Advantageous embodiments are described in the dependent claims.

SUMMARY OF THE INVENTION

According to the invention, a quantity characterizing at least indirectly the present state of motion of the vehicle is continuously determined and recorded in a drive unit, comprising at least an internal combustion engine and an electric motor—preferably designed as a transverse flux motor—, in particular, a diesel-electric drive system. This captured quantity is compared with prescribable comparative values for these quantities characterizing standstill, and/or low speeds or drive power and/or rotational speeds of the internal combustion engine. If these prescribable comparative values are not reached, then the present driver's request, expressed for example, by the accelerator setting is interpreted as a certain drive torque at the drive motors, and the power setting device of the internal combustion engine is adjusted correspondingly. If these prescribable comparative values are exceeded and/or if, corresponding to the interpretation of the driver's request, the drive power conveyed by the drive motors to the wheels as torque, or drawn by the generator, approximately reaches or exceeds a certain value, then the driver's request is interpreted as the prescribed value for the power to be conveyed to the drive wheels and/or to be drawn by the generator. In this case the adjustment works analogous to conventional drive trains. The driver's request, in this case interpreted as a prescribed power, should be approximately equal to the power resulting from the torque interpretation and/or the power conveyed to the drive wheels and/or drawn by the generator, so that during this transition an abrupt torque change on the driven component or on the internal combustion engine uncomfortable to the persons in the vehicle, cannot occur.

The inventor has recognized that if the setting range of the actuating device, especially that of the driver's request sensor coupled with the actuating device, is mapped onto the maximum by the wheel motors conveyable torque $T_{max}$, then, because of the functional relationship $T_{max}(n_{drive\ motor}) = P_{max}/n_{drive\ motor}$, the usable prescribed value range decreases with increasing rotational speed of the motor, $n_{drive\ motor}$, starting at $n_{drive\ motor}$, where the motor conveys maximum power. From this point on at the latest, it is reasonable, therefore, to map the greater portion of the setting range of the driver's request sensor onto the maximum drive power, or corresponding quantity, onto the maximum conveyable torque which is decreasing with increasing $n_{drive\ motor}$, as proposed by invention.

The setting range of the driver's request sensor preferably comprises in this case not only the prescribed value range for torque and/or power from zero to the respective maximum value, but includes negative values of the respective quantity, so that the setting range additionally includes retarding torque and/or retarding power, for the drive motor to convey, depending on driving speed, in case the driver's request sensor is idle. The retarding torque normally serves to simulate the slight deceleration which occurs in conventional drive trains when the accelerator is idle.

Equipmentwise the drive unit is provided with a control unit. This unit comprises a control arrangement which is provided with at least two input terminals—a first input terminal for receiving the actuating device signal representing a quantity characterizing the driver's request for a change in the state of motion, and a second input terminal for receiving the signal for a quantity describing at least indirectly the present state of motion of the vehicle. The quantity indirectly characterizing the state of motion of the vehicle is preferably determined continuously and sent to a compare-arrangement in the control arrangement.

This compare-arrangement contains at least one prescribable comparative value for the quantity characterizing the driving state. Hereby it is the possible to determine the quantity characterizing the present driving state directly in the unit of measure of the comparative value, or alternatively, using the appropriate conversion, to convert the quantity characterizing the actual driving state into a quantity which can be directly compared with the comparative value. In this latter case the compare-arrangement is equipped with a conversion unit. An example of this latter case would be the rotational speed of the drive wheels as the quantity describing the actual driving state and the comparative value would be a vehicle speed of a certain magnitude.

Corresponding to the results of the comparison—comparative value is exceeded or not reached—in an assign-arrangement prescribed values, corresponding to the signal from the driver's request sensor for a change in the state of motion, are determined for power or torque to be conveyed by the transverse flux motor to the drive wheels. The assign-function can be executed by way of code fields deposited in the control arrangement, or by calculation. If the comparative value is exceeded, then the driver's request is interpreted as the prescribed value for the power to be conveyed to the drive wheels and/or to be drawn by the generator. In this case the resulting adjustment of the power setting device on the internal combustion engine is essentially analogous to conventional drive systems. To this end, the driver's request, which is expressed by, for example, the intensity of actuating the accelerator, the displacement when actuating the accelerator and by other quantities which can be mapped, for example, by means of a sensor with a certain setting range, is converted into an adjustment of the power setting device. If the prescribed comparative value for the quantities characterizing the state of motion of the vehicle at stillstand and at a small velocity is exceeded, then the setting range of the driver's request sensor is mapped onto the maximum by the drive motor conveyable torque $T_{max}$. If the prescribed comparative value is not exceeded, then the driver's request is interpreted as torque which the transverse flux motor is to convey to the drive wheels.

Corresponding to the values assigned to the driver's request for the torque to be exerted by the transverse flux motor on the drive wheels, or for the power to be conveyed, a setting quantity is generated for the purpose of controlling a setting device to set the torque to be exerted by the transverse flux motor or the power to be conveyed by the transverse flux motor and/or to be drawn by the generator. These setting quantities are sent out by way of the output terminal of the control arrangement. The number of output terminals needed for this purpose depends on the number of possible setting devices to be controlled. Control possibilities for this case are well described in the literature, especially in document (1).

The present driving state can be described, for example, by the present speed. It can be determined, for example, by way of the rotational speed of the drive wheels or the present motor speed with due consideration of the generator-transverse flux motor unit coupled to it. In order to determine these quantities, appropriate sensors are provided on the drive wheels or on the motor output shaft.

The magnitude of the comparative value is the criterion for assigning the prescribed driver's request for changing the driving state to the power to be conveyed or the torque to be exerted on the drive wheels by the electric motor, especially the transverse flux motor. The comparative value is in this case a prescribable value of a quantity describing the driving state at least indirectly. This value characterizes vehicle stillstand and/or a low speed and/ or low drive power and/or a rotational speed of the internal combustion engine.

The assign-function can be executed by means of code fields deposited in the control arrangement, from which, corresponding to the driver's request, the required torque or the amount of power can be determined, and from which, depending on the quantity or quantities describing the present driving state, at least one setting quantity can be determined for controlling at least one setting device assigned to the electric motor and/or generator and/or internal combustion engine. Furthermore, it is possible to determine the corresponding values by calculation.

The comparative values and the assign-code fields can be set up by the manufacturer of the drive units.

Essential to the invention is the fact that the entire setting range of the actuating device, and therefore of the so-called driver's request sensor, is mapped onto both the power to be conveyed bus the electric motor to the drive wheels and the torque to be exerted by the electric motor on the drive wheels. The choice between assigning torque or power to the driver's request is a function of the driving state and the prescribed driver's request.

The control unit is preferably a part of the central controlling means assigned to the drive unit which has additional control functions.

The invention on hand makes it possible for a vehicle with a diesel-electric drive system, especially an internal combustion engine /generator power pack, to accelerate the vehicle from stillstand and low speeds without jerks or to even maintain the vehicle at stillstand on an incline without the need for an additional start controller.

DETAILED DESCRIPTION OF THE DRAWINGS

The solution according to the invention is described below using two figures.

Figure 1:
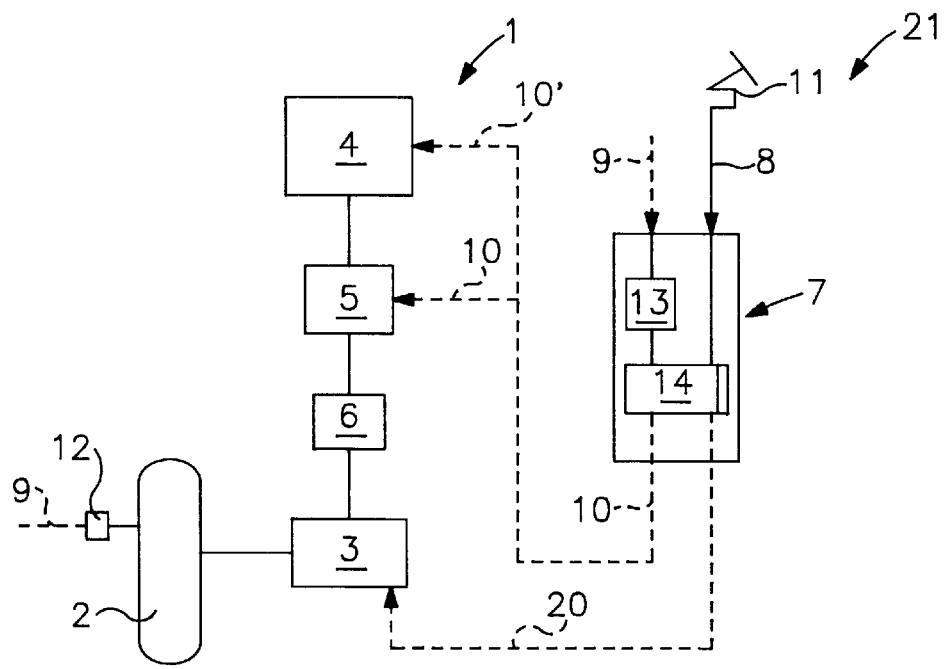
Figure 2:
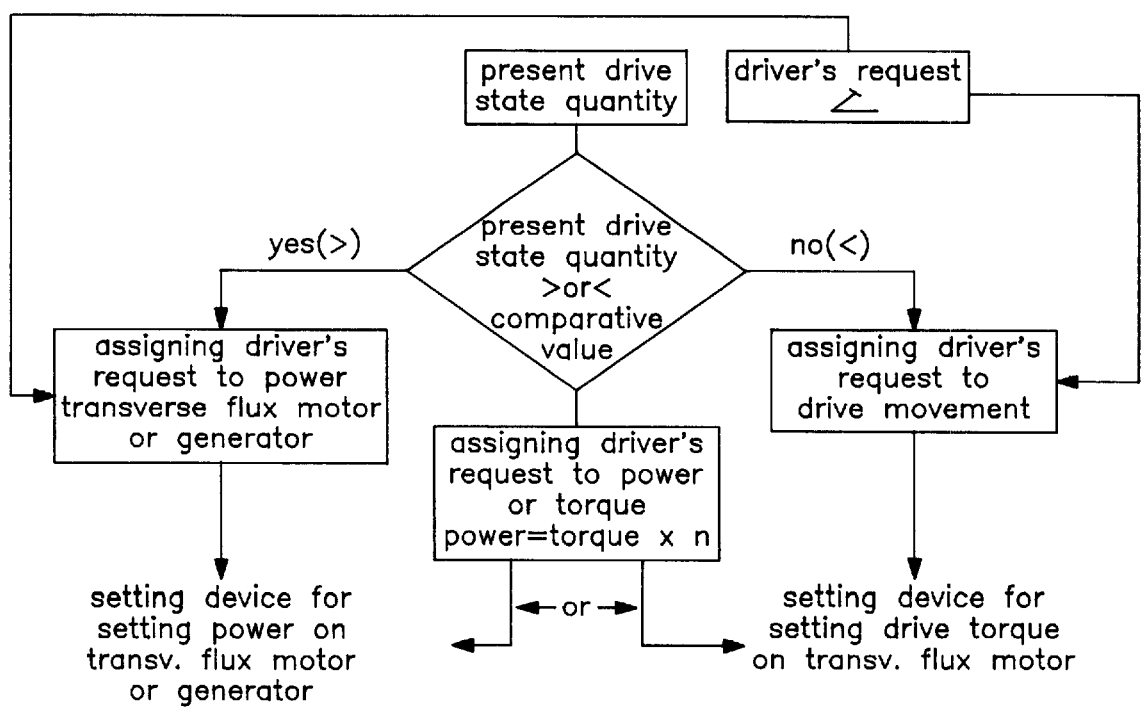

FIG. 1 a schematic representation of the drive system;

FIG. 2 a flow diagram for elucidating the process according to the invention.

DETAILED DESCRIPTION OF THE PREFERRED EMBODIMENT

FIG. 1 shows schematically a drive unit 1 according to the invention. It comprises an electric motor designed as a transverse flux motor 3 driving a drive wheel 2, an internal combustion engine 4 and a generator 5 mechanically coupled with the internal combustion engine 4. Each transverse flux motor 3 can be connected electrically with the generator 5, for example, by way of a direct current intermediate circuit 6. The generator 5 is preferably also designed as a transverse flux motor. The internal combustion engines 4 are normally diesel engines. Furthermore, a control unit 21 is assigned to the drive unit 1. The control unit 21 comprises at least a control arrangement 7 with at least two input terminals—a first input terminal 8 and a second input terminal 9—and an output terminal 10 and a further output terminal 20. The drive unit 1 is equipped with at least one actuating device 11 for prescribing a driver's request for the motion of the vehicle. These actuating devices are, for example, the accelerator and the brake pedal.

The first input terminal 8 of the control arrangement 7 is connected with the actuating device 11. The second input terminal 9 of the control arrangement is connected with a device 12 for capturing a quantity which at least indirectly describes the present driving state. The device 12 can be a sensor designed to measure the present rotational speed of the drive wheels 2 and therefore a quantity describing the speed of the vehicle.

The control arrangement 7 comprises a compare-arrangement 13. In it a quantity describing the present driving state is compared directly with a comparative value of this quantity, or the quantity describing the present driving state is first converted into a value for the vehicle speed, the drive power and/or the motor speed and then compared with comparative values of these quantities. If the comparative value is not reached, then, in an assign-arrangement 14 connected with the compare-arrangement, a prescribed value for a drive torque to be exerted on the drive wheels is assigned to the quantity describing the driver's request, and correspondingly, by way of a corresponding setting quantity at output terminal 20, at least one setting device for setting this drive torque at the electric motor is triggered. If the comparative value is exceeded, then, in an assign-arrangement 14 connected to the compare-arrangement, a prescribed value for power to be conveyed to the drive wheels is assigned to the quantity describing the driver's request and located at the first input terminal 8, and correspondingly, by way issuing a setting quantity at output terminal 10, at least one setting device for setting power at the transverse flux motor 3 is triggered.

The connection 10' shows here the possibility of prescribing power by way of the power setting device of the internal combustion engine.

FIG. 2 shows again, by means of a flow diagram, the method by which the driver's request is assigned to power or torque, respectively, to be conveyed by the transverse flux motor 3 to the drive wheels 2.

I claim:

1. A process for operating a drive unit for a vehicle having a set of drive wheels and
   at least one electric motor driving said drive wheel at least indirectly, said drive unit including and
   a generator mechanically coupled with the internal combustion engine and said electric motor, and
   which generates a signal representative of a quantity characterizing
   an actuating device a driver's request for a change in the state of motion of the vehicle comprising the steps of:
   sensing at least one quantity which represents a driving state of the vehicle;
   manipulating said actuating device in order to prescribe a driver's request regarding the motion of the vehicle;
   determining at least one quantity which describes the present driving state at least indirectly of the vehicle;
   comparing the quantity describing the present driving state with at least one fixed prescribable comparative value, said comparative value a prescribed value of a quantity representing said vehicle at one of standstill, low speed, and drive power, and motor rpm, wherein
   if the fixed prescribable comparative value is not reached, a prescribed value for a drive torque to be exerted on the drive wheels is assigned to the quantity describing the driver's request, and correspondingly triggering at least one setting quantity for a setting device for setting this same drive torque at the electric motor, wherein
   if the fixed prescribable comparative value is exceeded, then a prescribed value for power to be conveyed to the drive wheels is assigned to the quantity describing the driver's request, and correspondingly, triggering at least one setting quantity for a setting device for setting this same drive power at one of the electric motor and generator.

2. The process according to claim 1, wherein if the quantity describing the driving state at least indirectly is equal to the fixed prescribable comparative value, then the assigned prescribed value describing the driver's request for power to be conveyed by the electric motor to the drive wheels is equal to the power obtained when the quantity describing the driver's request is assigned to the drive torque to be exerted by the electric motor to the drive wheels.

3. The process according to claim 1, wherein a torque range from zero to the maximum torque and a power range from zero to the maximum possible power is assigned to the setting range of the actuating device for selection.

4. The process according to claim 1, wherein
   a torque range from less than zero to a maximum torque and a power range from less than zero to a maximum possible power is assigned to the setting range of the actuating device for selection, and a further step comprises releasing
   the actuating device reproducing a retarding torque based on the assignment of values which depend on the present driving state.

5. The process according to claim 1, wherein the quantity characterizing the driving state is determined continuously.

6. A drive unit for a vehicle having at least one drive wheel comprising
   at least one electric motor coupled to the drive wheel:
   an internal combustion engine indirectly coupled to said electric motor;
   a generator coupled mechanically with the internal combustion engine,
   each of said electric motors electrically connected with the generator;
   at least one actuating device for prescribing a driver's request for the motion of the vehicle, said actuating device connected to said motor;
   a control unit comprising a control arrangement with at least one first input terminal and one first output terminal,
   the first input terminal connected with said actuating device, the first output terminal connected indirectly with a setting device for influencing one of the power drawn by the generator and the power that can be conveyed by the electric motor, wherein the control arrangement comprises a second output terminal connected with a setting device for influencing the torque exerted by the electric motor, the control arrangement is provided with a second input terminal which is connected with a capturing device for characterizing the actual state of motion of said vehicle with a measurable quantity, the control arrangement further including a compare-arrangement for comparing the quantity characterizing the present driving state with a prescribable comparative value, the control arrangement further including an assign-arrangement connected to the output of the compare-arrangement, to the signal for the driver's request located at the first input terminal, and to a second output terminal connected to said electric motor, wherein when preset state values are less than the comparative value, a prescribed value for a drive torque is generated and sent through said output terminal, at least one setting device for setting this same drive torque at the electric motor and wherein for values greater than the comparative value, a prescribed value for power to be conveyed to the drive wheels is determined, and correspondingly, at least one setting quantity is generated and sent through the first output terminal to at least one setting device for setting the power to be conveyed by one of the electric motor and the power to be drawn by the generator.

7. The drive unit according to claim 6, wherein the electric motor is designed as a transverse flux motor.

8. The drive unit according to claim 6, wherein the actuating device is an accelerator and a brake pedal.

9. The drive unit according to claim 6, wherein the means in the assign-arrangement are deposited code fields.

10. The drive unit according to claim 6, wherein the means in the assign-arrangement are calculation programs.

11. Process according to claim 2, wherein a torque range from zero to the maximum torque and a power range from zero to the maximum possible power is assigned to the setting range of the actuating device for selection.

12. Process according to claim 2, with the following characteristics: a torque range from less than zero to the maximum torque and a power range from less than zero to the maximum possible power is assigned to the setting range of the actuating device for selection, when the actuating device is released, the assignment of values, which depends on the present driving state, is such that the range of the retarding torque can be reproduced.

13. Process according to claim 2, wherein the quantity characterizing the driving state is determined continuously.

14. Process according to claim 3, wherein the quantity characterizing the driving state is determined continuously.

15. Drive unit according to claim 7, wherein the actuating device is an accelerator and/or a brake pedal.

16. Drive unit according to claim 7, wherein the means in the assign-arrangement are code fields which can be deposited.

17. Drive unit according to claim 8, wherein the means in the assign-arrangement are code fields which can be deposited.

18. Drive unit according to claim 7, wherein the means are calculation programs which are to be employed.

19. Drive unit according to claim 8, wherein the means are calculation programs which are to be employed.

20. Drive unit according to claim 9, wherein the means are calculation programs which are to be employed.

* * * * *